United States Patent [19]
Malone, Sr.

[11] Patent Number: 6,124,994
[45] Date of Patent: Sep. 26, 2000

[54] SYSTEM AND METHOD FOR PROVIDING NONADJACENT REDUNDANCY SYNCHRONIZATION BYTES

[75] Inventor: Daniel James Malone, Sr., San Jose, Calif.

[73] Assignee: International Business Machines Corporation, Armonk, N.Y.

[21] Appl. No.: 08/782,207

[22] Filed: Jan. 10, 1997

Related U.S. Application Data

[62] Division of application No. 08/570,878, Dec. 12, 1995.

[51] Int. Cl.$^7$ ........................................ G11B 5/09
[52] U.S. Cl. ................... 360/48; 360/51; 360/53
[58] Field of Search ................. 360/48, 51, 53, 360/31

[56] References Cited

U.S. PATENT DOCUMENTS

| | | | |
|---|---|---|---|
| 4,494,234 | 1/1985 | Patel | 371/38 |
| 4,706,250 | 11/1987 | Patel | 371/39 |
| 4,707,681 | 11/1987 | Eggenberger et al. | 340/347 DD |
| 4,748,611 | 5/1988 | Tsuyoshi et al. | 369/59 |
| 4,777,542 | 10/1988 | Ozaki | 360/48 |
| 4,788,685 | 11/1988 | Sako et al. | 371/38 |
| 4,862,443 | 8/1989 | Tsuji et al. | 369/59 |
| 4,907,215 | 3/1990 | Sako et al. | 369/59 |
| 5,036,408 | 7/1991 | Leis et al. | 360/48 |
| 5,117,313 | 5/1992 | Lokhoff et al. | 360/40 |
| 5,134,529 | 7/1992 | Inazawa et al. | 360/48 |
| 5,170,299 | 12/1992 | Moon | 360/77.08 |
| 5,220,466 | 6/1993 | Coker et al. | 360/46 |
| 5,237,574 | 8/1993 | Weng | 371/40.1 |
| 5,255,131 | 10/1993 | Coker et al. | 360/48 |
| 5,285,327 | 2/1994 | Hetzler | 360/48 |
| 5,319,508 | 6/1994 | Tsunoda et al. | 360/77.08 |
| 5,369,535 | 11/1994 | Hetzler | 360/78.14 |
| 5,379,160 | 1/1995 | Otani | 360/49 |
| 5,418,657 | 5/1995 | Machado et al. | 360/40 |
| 5,420,730 | 5/1995 | Moon et al. | 360/77.08 |
| 5,420,893 | 5/1995 | Ward | 375/368 |
| 5,438,559 | 8/1995 | Best et al. | 369/54 |
| 5,440,474 | 8/1995 | Hetzler | 360/135 |
| 5,461,631 | 10/1995 | Blaum et al. | 395/182.04 |

(List continued on next page.)

OTHER PUBLICATIONS

Draft International Standard ISO/IEC DIS 10089, "Information technology—130 mm rewritable optical disk cartridges for information interchange", pp. 1–106, 1990.

Patel, "Error Recovery Scheme for the IBM 3850 Mass Storage System", IBM J. Res. Develop., vol. 24, No. 1, Jan. 1980, pp. 32–42.

Bliss et al., "Fault–Tolerant Sync Byte for Run–Length–Limited Codes", IBM Technical Disclosure Bulletin, vol. 29, No. 1, Jun. 1986, pp. 151–157.

*Primary Examiner*—Paul Loomis
*Assistant Examiner*—Regina Y. Neal
*Attorney, Agent, or Firm*—Ingrid M. Foerster; Randall J. Bluestone; Abdy Raissinia

[57] ABSTRACT

The present invention provides a system, method and data format wherein a redundant sync byte or group of sync bytes is provided in a data sector at a distance sufficient to isolate the redundant sync byte from the primary sync byte in the event of multiple byte defects. In a first embodiment, a redundant sync byte, or group of sync bytes, is provided in the AGC field preceding the primary sync region. Upon failure to detect the primary sync byte, an attempt is made on a subsequent revolution to read the secondary sync byte, either by holding the AGC gain prior to reaching the data block, or initiating an "early read" just prior to reaching the data block. In a second embodiment of the invention, the redundant sync byte is provided within the data field subsequent to the primary sync region. On failing to detect the primary sync byte, the secondary sync byte can be read immediately or can be postponed until a subsequent revolution. The missed first data region is reconstructed using ECC information. In third and fourth alternative embodiments, a secondary sync byte is provided either between the primary sync byte and the start of data or between the primary sync byte and AGC field.

29 Claims, 7 Drawing Sheets

U.S. PATENT DOCUMENTS

| | | | |
|---|---|---|---|
| 5,475,540 | 12/1995 | Gold | 360/48 |
| 5,517,631 | 5/1996 | Machado et al. | 395/438 |
| 5,523,903 | 6/1996 | Hetzler et al. | 360/77.08 |
| 5,541,783 | 7/1996 | Yamamoto et al. | 360/48 |
| 5,589,995 | 12/1996 | Saito et al. | 360/48 |
| 5,604,464 | 2/1997 | Yamawaki | 360/53 |
| 5,796,690 | 8/1998 | Kanno | 369/48 |
| 5,812,335 | 9/1998 | Kool et al. | 360/51 |
| 5,844,911 | 10/1998 | Schadegg et al. | 371/10.2 |
| 5,844,920 | 12/1998 | Zook et al. | 371/40.14 |
| 5,867,353 | 2/1999 | Valent | 360/77.04 |

SYSTEM AND METHOD FOR PROVIDING NONADJACENT REDUNDANCY SYNCHRONIZATION BYTES

This is a divisional of Ser. No. 08/570,878 filed on Dec. 12, 1995.

BACKGROUND OF THE INVENTION

1. Technical Field

The present invention relates generally to the retrieval of data from a storage medium and more particularly to a system and method for enabling synchronization of a clock to read data from the medium when the primary synchronization byte has been corrupted.

2. Description of the Background Art

Magnetic disk drives utilized for the storage of information are well-known. Data is stored in the form of magnetic transitions created on the surfaces of one or more magnetically coated storage disks stacked on a rotatable spindle motor assembly. The data is organized into a plurality of annular rings or tracks, and each group of tracks having a same location on the disks is referred to as a cylinder. Data tracks are further subdivided into one or more blocks or sectors of data. The actual format of a data track depends upon the particular design of the disk drive system. Regardless of format, the electronics controlling the storage and retrieval operations of a disk drive must have the means to precisely and reliably determine the start of user data in each data sector so that data may be accurately reproduced.

Data is retrieved or "read" from a disk surface with a magnetic transducer or read "head" which is positioned in close proximity to the rotating disk for sensing the magnetic transitions and converting them into an electrical signal. For high track densities, magnetoresistive (MR) read heads are desirable because of their high degree of sensitivity. Each head is electrically coupled to arm electronics (AE) including a preamplifier, which in turn is coupled to a data channel preferably of the PRML type. The PRML channel includes, among other things, an automatic gain control circuit (AGC), a variable frequency oscillator (VFO) circuit, and sync byte detection circuitry. Descriptions of PRML channels are provided in commonly assigned U.S. Pat. Nos. 5,220,466 and 5,255,131.

The heads are mounted to a linear or rotary actuator assembly for selective positioning of the heads over desired tracks. Movement of the actuator assembly is controlled by the servo electronics and servo microcode, which regulate a control signal to a voice coil motor. Closed loop servo systems utilize feedback information from the disk to find and maintain a position over a target track. This feedback information may be located on a single, dedicated disk surface (i.e., dedicated servo) or embedded on data tracks between portions of data (embedded servo). Numerous servo systems are known in the art for providing a disk drive with the means for seeking to a desired track and following the track during reading or writing. Embedded servo disk drives are described, for example, in U.S. Pat. Nos. 5,285,327 and 5,369,535.

Reading and writing of data is accomplished through the data channel under the direct control of a disk controller, which includes a sequencer for executing microcode control sequences. Data to be written to a storage disk is received by the disk drive in binary form. Before writing, the incoming data stream is first encoded and clocked for enhanced readback reliability. Encoding assures that magnetic transitions recorded around a track are spaced sufficiently far apart to prevent interference between adjacent transitions which may corrupt the readback signal. For a more detailed discussion of encoding schemes, the reader is referred to commonly assigned U.S. Pat. Nos. 4,707,681 and 5,461,631. Clocking assures constant spacing of transitions to obtain a desired track bit density and a constant readback signal frequency. Data frequency may be constant from track to track, or may vary, e.g., as in banded recording schemes. See, for example, U.S. Pat. No. 5,440,474. In sector servo systems, data sectors are usually recorded at frequencies and amplitudes different from those of the servo sectors. In addition, some of the data sectors may be "split" by servo fields.

A data track for any of the preceding formats typically comprises "splices" of data. That is, portions of data will be written to the track at different times, and consequently, the frequency of each portion will not be synchronous with other portions on the same track. It is therefore crucial to data retrieval that the disk drive's read channel can adjust to the proper clock phase of each data splice. Additionally, amplitude may vary among the heads and frequency may vary from band to band. Thus the channel must also be able to adjust to the particular amplitude and frequency of the data splice being read. Finally, it is important to correctly identify the starting location of the first frame of user data in the data splice.

To facilitate the preceding requirements, a preamble is annexed to each data splice at the time of writing. The preamble normally includes a plurality of repeating patterns having the same amplitude, frequency and phase as the data, to be used by the channel in preparation for reading. It also includes an identifier for use in locating a particular data block. Some disk drives employ headerless or ID-less data block formats for enhanced data capacity, i.e., data blocks in which the preamble does not contain identification or "ID" information. See, for example, commonly owned U.S. Pat. No. 5,438,559, and application Ser. No. 08/082,826, filed on Jun. 23, 1993 and Ser. No. 08/218,546, filed on Mar. 28, 1994 for a description of disk drives employing a "NoID" (™) format.

When a read head encounters a desired data splice, it first passes over an amplitude adjustment portion of the preamble, often called the automatic gain control or AGC field. The AGC field contains a repeating pattern for producing a corresponding repetitive electrical signal of the same amplitude as the data to be read. The repeating signal is used by the AGC circuit in the data channel to adjust a variable gain amplifier (VGA) and thereby amplify the read signal to a predetermined normalized level. The AGC field must be long enough to accommodate fluctuations in spindle speed, transients occurring in a write to read switch, and the actual amplitude adjustment operation. Determination of the appropriate length or number of bytes is made by studying the response of a particular disk drive configuration.

The head next passes over a data synchronization or VFO portion of the preamble comprising a repeating pattern that for simplicity is identical to the repeating pattern of the AGC field. The VFO pattern produces a repetitive electrical signal of the same frequency and phase as the data to be read. It is used by the VFO circuit in the data channel for tuning a variable frequency oscillator, e.g., a voltage controlled oscillator (VCO), to match the frequency and phase of the signal. The VFO field must be long enough to accommodate this synchronizing operation.

The VFO field is followed by a pattern or group of adjacent patterns, generally referred to as "sync bytes", that mark the beginning of the data field and provide a frame of reference for correctly distinguishing data bytes. Sync bytes are detected by sync byte detection logic in the data channel that looks for one or more predetermined sync byte patterns during a certain window of time. Once the sync byte is identified, the data bytes that follow can be properly decoded.

Portions of the information on a magnetic disk are known to become defective over time for a variety of reasons. Bits, bytes, and even large areas of dropout, e.g., 15–20 bytes in length, occasionally occur and may be the result of phenomena such as contamination or thermal asperities. Data loss is avoided in some cases with error correction that is used to detect errors and reconstruct lost bits or bytes of data. Two examples of error correction code are provided in commonly assigned U.S. Pat. Nos. 4,494,234 and 4,706,250. Despite this protection, disk defects which corrupt the sync byte field are catastrophic to data retrieval. Thus a sync byte detection scheme is required that can tolerate both small and large dropout.

A number of schemes have been implemented to enhance the robustness of sync bytes against small defects in magnetic disk drives. For example, IBM Technical Disclosure Bulletin Vol. ?, June 1986, pp. 151–157 discloses a sync byte pattern and sync byte detection scheme able to correct for one to two bits of error. Some disk drive designs employ three adjacent sync bytes per data block and use a voting scheme to verify the detection of two out of three sync bytes. The sync bytes are written with alternating patterns to distinguish which of the two out of three bytes have been detected. Another fault tolerant scheme, proposed in U.S. Pat. No. 5,420,893, eliminates the use of sync bytes altogether by providing two overlapping control patterns in the preamble having different frequencies which coincide at the start of data. Each of these schemes, however, is susceptible to large dropout.

Resynchronization schemes have been adopted in both magnetic tape and optical disk storage technologies to address the problem of large dropout. For example, the ISO standard for optical disk storage devices provides 3 adjacent sync bytes prior to each block of user data and requires two resynchronization fields to be inserted between each sub-block of 15 or 20 bytes of user data, depending upon the number of data bytes in the block. These resynchronization fields are distinguishable from the user data, e.g., they may violate the data encoding convention of the device. See "Information Technology—130 mm Rewritable Optical Disk Cartridges for Information Interchange", Draft International Standard, ISO/IEC DIS 10089 (1990).

In the IBM 3850 magnetic tape drive system, data is recorded in slanted stripes across the magnetic tape rather than in multiple, longitudinal tracks along the tape. Each stripe further comprises a sync field and primary sync byte followed by a plurality of data segments. Each segment, in turn, is subdivided into a plurality of data sections, and each data section is both preceded and followed by a unique synchronization signal for resynchronizing a read clock. (See "Error Recovery Scheme for the IBM 3850 Mass Storage System", by A. Patel, IBM J. Res. Develop., Vol. 24, No. 1, January 1980, pp. 32–42.)

What is needed, however, is some manner of protecting against the corruption of a sync byte or group of adjacent sync bytes in a magnetic disk drive to ensure proper retrieval of user data. More particularly, a redundant sync byte format, detection system, and method are required for providing tolerance of relatively large, multiple bit or byte disk defects to improve the overall reliability of a magnetic disk drive.

SUMMARY OF THE INVENTION

Accordingly, the present invention provides a system, method and data format wherein a redundant sync byte or group of sync bytes is provided in a data sector at a distance sufficient to isolate the redundant sync bytes from the primary sync byte(s) in the event of multiple byte defects. In a first embodiment, a redundant sync byte, or group of sync bytes, is provided in the AGC field preceding the primary sync region. A secondary VFO field is also provided for VFO synchronization. The secondary VFO field can be shorter than the primary VFO field, particularly if the data channel supports a "fast sync" mode of operation, because numerous attempts to read the secondary byte may be made in an error recovery mode, loosening spindle speed tolerances somewhat. The first embodiment is particularly suitable to high capacity disk drives, since no additional real estate is required in the provision of a secondary sync region.

According to this first embodiment, if a primary sync byte field is unreadable, an error recovery procedure is invoked and the channel attempts a read of the secondary sync bytes on a subsequent revolution. The previously obtained AGC gain is held or reestablished and held on a different data block prior to reaching the target block. Alternatively, an "early read" is initiated just prior to reaching the data block. The data channel then synchronizes to the secondary VFO field and detects the secondary sync byte, then "coasts" over the primary fields for a predetermined delay to the start of data.

In a second embodiment of the present invention, the redundant sync bytes are provided within the data field subsequent to the primary sync region. The data is thus split by the secondary sync bytes into first and second portions, the first portion preferably including only a small number of bytes.

During normal operation, the primary sync byte field is used for synchronization, and the second sync byte field is ignored, e.g., by disabling the sync byte detector when the head passes over this portion of the data field. If the primary sync bytes are missed, an error recovery procedure is invoked to immediately read the secondary sync bytes, and if this attempt is successful, the remainder of the data field. If the data channel is not fast enough to switch to error recovery mode and detect the secondary sync bytes in the same revolution, the procedure is executed on a subsequent revolution. In this latter instance, the channel either attempts to reread the primary sync bytes or ignores them, and resynchronization of the VFO occurs on either the primary or secondary VFO field (if a secondary VFO field is provided, that is). In either case, the missed first portion of the data field is reconstructed from the ECC field. In this second embodiment, the data byte count must be modified to correspond to the second data region for error recovery. This method is particularly suitable to disk drive designs wherein performance is a prime consideration and the channel is able to switch quickly from normal to error recovery mode.

In third and fourth related embodiments, a secondary sync byte field is provided either between the primary sync byte field and the start of data or between the primary sync byte field and AGC field. The formats are analogous to the first and second embodiments, but leave the data and AGC fields intact. Consequently, they are more costly in disk real estate and should only be used in drives where capacity is secondary to reliability of data retrieval. The region between the primary and secondary sync bytes is a repetitive VFO pattern or a pad field, and has a sufficient length to isolate the sync bytes against multiple byte drop out, while maximizing data capacity.

According to the third and fourth embodiments proposed, the primary sync byte field is used for synchronization and the secondary sync byte field is ignored. If the primary sync byte is unreadable, however, an attempt is made to read the secondary sync bytes using one of two procedures analogous to those outlined for the first and second embodiments discussed above.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

DETAILED DESCRIPTION OF THE PREFERRED EMBODIMENT

Figure 1:
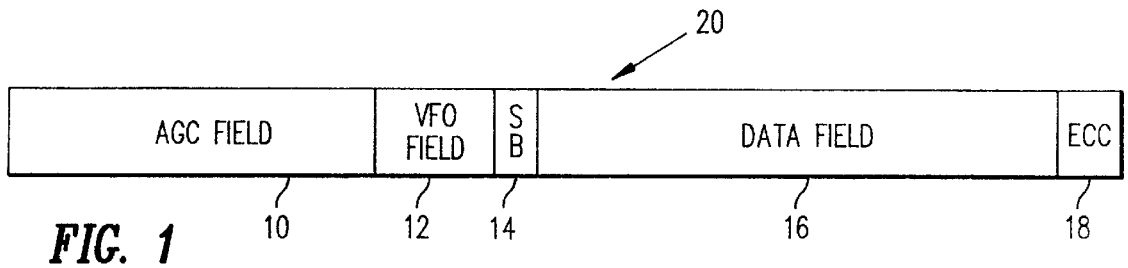
FIG. 1 illustrates a headerless data block format suitable for practicing the present invention.

In the preferred embodiment of the present invention, a redundant sync byte data block format is implemented in a disk drive using headerless or "NoID" (™) data blocks for improved data capacity. An example of a headerless data block 20 is shown in FIG. 1, including an AGC recovery field 10, a clock synchronization or VFO field 12, a sync byte field 14 including one or more adjacent sync bytes, a data field 16, and an error correction code or ECC field 18. For convenience, the AGC field 10 and VFO field 12 are written with the same repetitive synchronization pattern to provide a single, continuous field. The preferred length of the primary sync field 14 and AGC field 10 varies with rotational speed and read channel performance. In a group of 7200 RPM disk drives having a 14 MB/sec data rate, for example, the minimum combined field length was determined to be 34 bytes to allow for disk speed variations, settling of AGC circuit transients, gain adjustment and VFO locking. The sync byte field 14 preferably includes three adjacent bytes of sync patterns for use in a two-out-of-three voting detection scheme. It will be understood, however, that the exact composition of field 14 is not critical to implementation of the present invention, so long as a pattern is provided that can be distinguished in some manner by the read channel electronics of the disk drive.

The data field 16 length is typically customer-specified, and the ECC field 18 length depends upon the size of the data field and the ECC coding scheme employed. For a data field of 512 bytes, 18 bits of ECC is generally sufficient. It will also be appreciated that data and ECC field lengths will also vary depending upon the data block type. For example, block 20 of FIG. 1 may represent an entire data sector or merely a subblock of a split data sector (defined below). The AGC and VFO field lengths may also vary with block type, e.g., they may be shorter in data subblocks than in full data sectors.

Figure 2A:
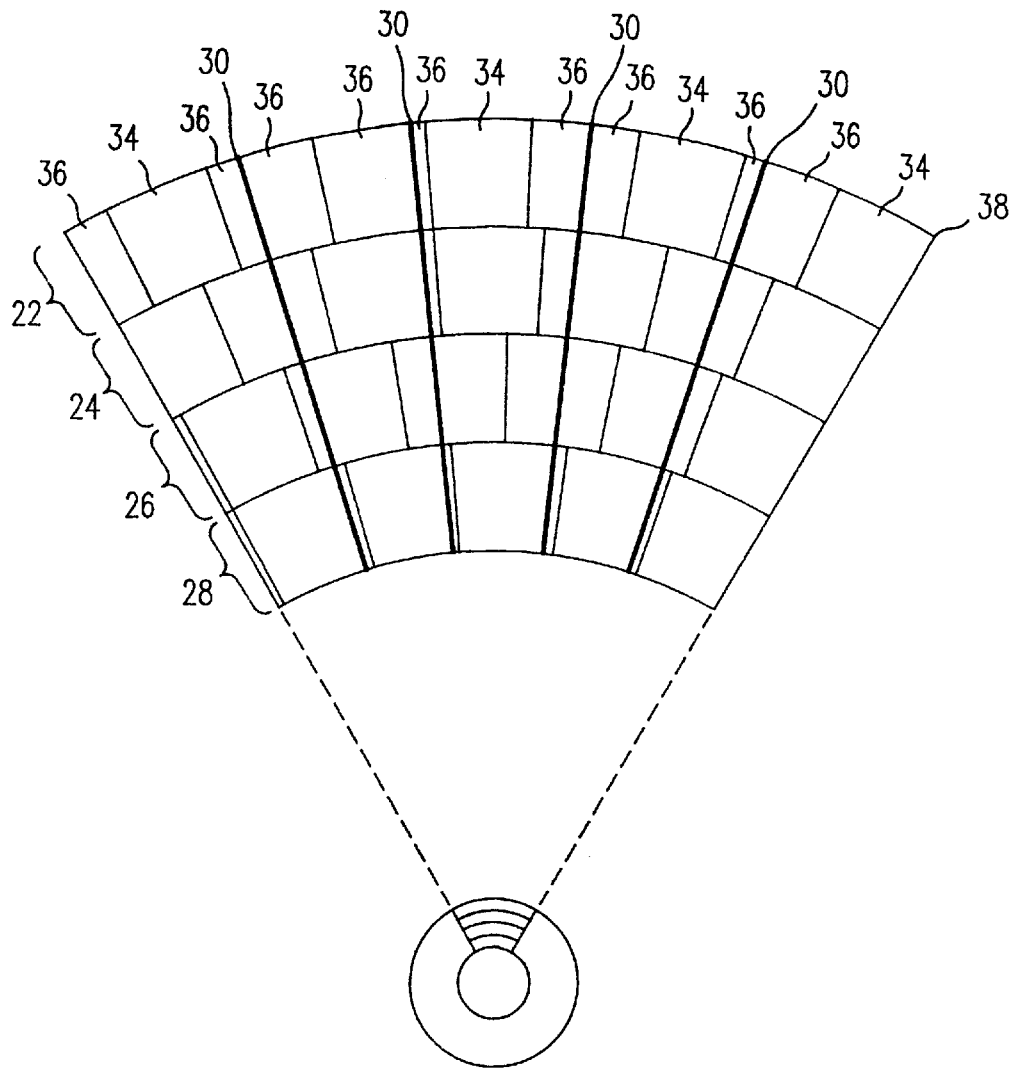
FIG. 2A illustrates a sectored servo disk format suitable for practicing the present invention, having split data fields and banded tracks.

FIG. 2A illustrates the preferred sector servo disk format of a disk drive suitable for implementing the present invention. Servo sectors 30 are recorded radially at equally spaced locations around the disk 50, and at a constant recording frequency from track to track across the disk. The present invention is also easily adapted to other embedded servo schemes, as well as to dedicated servo disk drives.

Figure 2B:
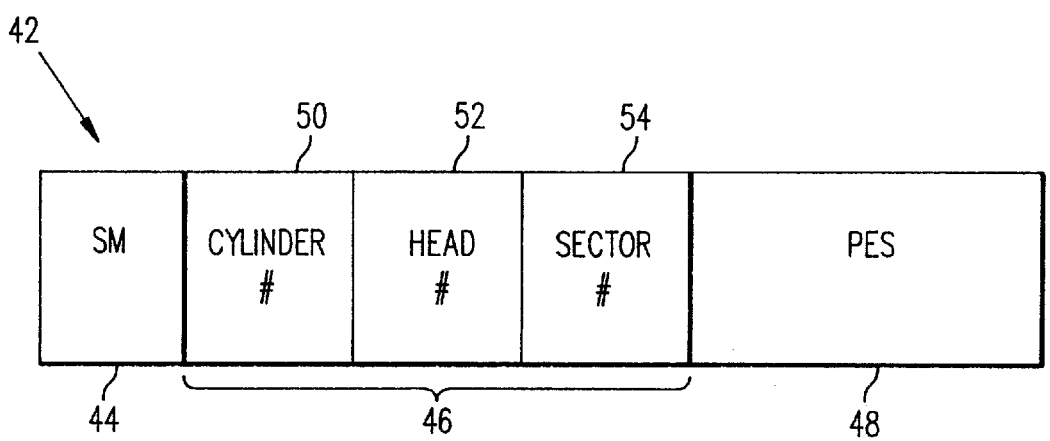
FIG. 2B is representative of a servo field suitable for the disk format of FIG. 2A.

FIG. 2B provides an enlarged view of one of the servo sectors of FIG. 2A, including an identifier mark or sector mark 44, a grey code field or SID 46, and positioning or PES information 48. The sector mark 44 is a timing mark, such as a dibit, indicative of the beginning of the servo sector 42. The grey code field 46 preferably includes cylinder number 50 and head number 52 for seeking to a specific track, as well as a sector number 54 unique to the track for identifying the current servo sector passing under the read head. For convenience, servo sectors are numbered consecutively in ascending order from a first servo sector designated as the index sector. The positioning information 48, preferably in the form of a quadrature burst, is used to generate a position error signal indicative of transducer or head alignment with respect to the centerline of a track. The position error signal, in turn, provides information to the servo electronics for correcting the head alignment in a track following mode.

Referring again to FIG. 2A, the cylinders or tracks are organized into a plurality of zones or bands, each band including a predetermined number of tracks. The predetermined number may vary from band to band, or may be a constant. In the preferred embodiment, the disk format of a disk drive practicing the present invention includes four bands, 22, 24, 26, 28, each band having a fixed number of tracks, and a track density of approximately 6000 tracks per inch. The data recording frequency within each band remains constant, but increases from band to band moving from the inner diameter (ID) to the outer diameter (OD) of the disk.

Data is preferably recorded in data sectors, each having a fixed length and a predetermined circumferential location within its respective zone or band. Blocks of data sectors 34, 36 are shown in FIG. 2A. Because data frequency varies across the disk, the ratio of data sectors to servo sectors changes from band to band and may result in some data sectors being "split" into subblocks by the radial servo sectors 30. Thus in FIG. 2A, data subblocks are designated with the numeral 36 and uninterrupted sectors are designated with the numeral 34. For purposes of the present invention, the term "data block" will henceforth refer to both continuous data sectors and to subblocks of split data sectors.

Because of the preferred sector servo disk format, each data block 20 is preceded on the track by one of two types of information: either another data sector or subblock having the same amplitude and frequency; or a servo sector having a different amplitude and frequency. The distinction is of significance in a first embodiment of the present invention. Again, it will be appreciated that the present invention may easily be adapted to disk drives employing other disk formats, such as those employing constant linear density (CLD) recording and variable data block sizes.

The present invention shall now be described with reference to FIGS. 3, 4, 5A and 5B. As noted previously, the primary objective of the invention is to provide a data block format that provides a redundant sync byte field sufficiently spaced from the primary sync byte field to assure the readability of data despite the occurrence of disk defects spanning multiple bytes. Although four preferred data block formats are described, it shall be understood that other suitable formats may become apparent to those skilled in the art without departing from the spirit and scope of the claimed invention.

Figure 3:
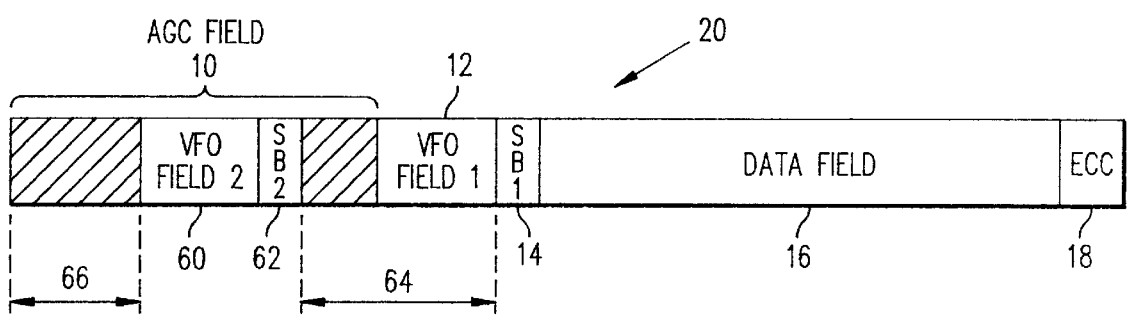
FIG. 3 depicts a data block format including a redundant sync byte field within the AGC according to a first embodiment of the present invention.

Turning now to FIG. 3, a first embodiment is shown in which a secondary VFO field 60 and secondary sync byte field 62 are provided in the AGC field 10 of a headerless data block 20. VFO field 12 and sync byte field 14 will now be referred to as the primary VFO field and primary sync byte field. The AGC field 10 and primary VFO field are preferably written with the same repeating pattern. The same pattern is also written to the secondary VFO field 60 and includes at least the minimum number of bytes required by the channel electronics to establish a VFO lock. Preferably, the data channel of the disk drive employing this preferred data block format is capable of a fast sync operation so that the secondary VFO field 60 can be shorter than the primary VFO field 12. Spindle speed variation tolerances are also more lenient in error recovery, accommodating a shorter VFO field length. The actual length of the secondary VFO field 60, like the primary VFO field, is determined by the spindle speed and channel characteristics. For example, an appropriate length for this field in a 7200 RPM disk drive having a data rate of 14 MB/sec and a data channel capable of performing a fast sync operation, was found to be at least 16 bytes.

The composition of the secondary sync byte field 62, for simplicity, is chosen to be the same as that of the primary sync byte field 14 as described with reference to FIG. 1, although this limitation is not required for practicing the present invention and may even be undesirable in some disk drive designs. The data and ECC fields 16, 18 of the data block of FIG. 3 do not differ from those of FIG. 1.

The precise location of the secondary fields 60 and 62 within the AGC field 10 is determined by a predetermined optimal separation 64 between primary and secondary sync bytes 14, 62, and by the minimum number of bytes required for gain adjustment and VFO locking prior to the secondary sync byte field 62. Optimal separation 64 depends upon the actual sizes of defects occurring in a particular disk drive design, the probability of occurrence of each defect size, and the degree of risk assumed by the disk drive designers, as illustrated by the following example. It will be assumed that a particular group of disk drives are observed to have recurrent multiple byte defects ranging from between 12–16 bytes in length, and that a distribution curve shows the occurrence of 14–16 byte defects to be substantially lower than the occurrence of 12–13 byte defects. A very conservative design might require a minimum separation of 16 bytes to accommodate the infrequent 16 byte errors and the possibility of a defect occurring exactly between the primary and secondary sync bytes. A less conservative design might shave the optimal separation down to 8–12 bytes, the probability of a large defect occurring exactly between the primary and secondary sync bytes being considered small enough to safely discount.

The minimum combined length 66 of the AGC subfield and secondary VFO field 60 is dependent upon AGC and VFO circuit characteristics. It is also dependent upon the particular error recovery method implemented, as will be discussed subsequently.

The data block format of FIG. 3 is particularly suitable for implementation in disk drives in which data capacity is a priority, since placement of the secondary sync byte 62 in a preexisting field does not consume additional disk real estate.

Figure 4:
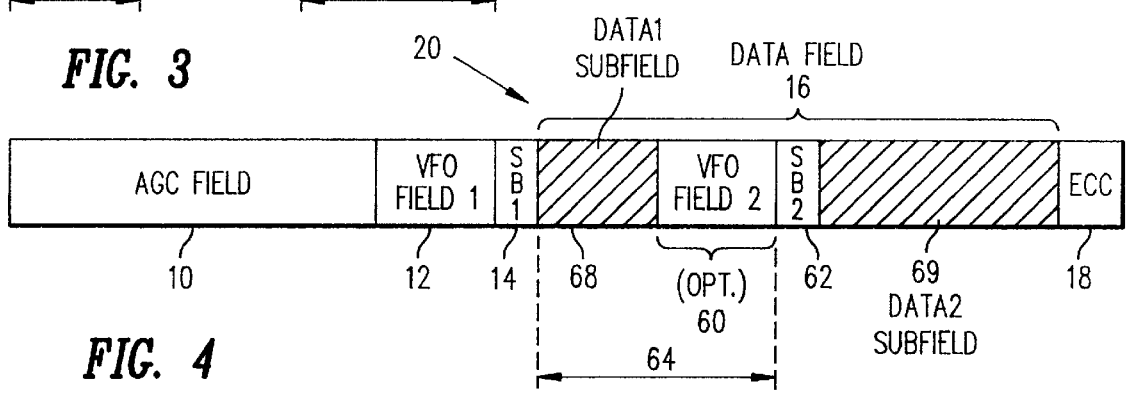
FIG. 4 depicts a data block format including a redundant sync byte field within the data field according to a second embodiment of the present invention.

A second data block format is shown in FIG. 4, wherein a redundant sync byte field 62 is provided within the data field 16. According to this embodiment, the data field 16 is split into first and second portions or subfields 68, 69. The primary and secondary sync bytes 14, 62 are separated by at least the predetermined optimal byte separation, determined in the same manner as described in the previous embodiment. A secondary VFO field 60 may be provided, as shown, if data capacity is not a primary consideration. However, this field is not required according to at least one error recovery method described below. An error recovery method utilizing the optional field 60 is also provided below. The AGC field 10, primary VFO field 12 and primary sync bytes 14 are the same as those shown in FIG. 1.

Use of the secondary sync byte field 62 during error recovery results in loss of the data from the first data subfield 68. The lost data according to this embodiment is reconstructed from ECC information provided in the ECC field 18 appended to the data field 16. As will be appreciated by those familiar with error correction code, knowing the location of the first data subfield simplifies the reconstruction process, since the byte locations do not have to be resolved with the ECC polynomial.

Numerous ECC coding methods are presently known, each having a limit to the number of errors it is able to correct. Thus an appropriate ECC must be selected to accommodate the required length of the first data subfield. The data subfield length depends upon the predetermined optimal sync byte separation 64 and upon whether or not a secondary VFO field 60 is provided. To satisfy the competing requirements of maximum ECC tolerance and minimum optimal separation, the first data subfield 68 is preferably substantially shorter than the second subfield 69. Alternatively, if the ECC scheme cannot accommodate a data field having the optimal isolation length, a number of modifications can be made to the data block format to meet these needs. For example, if optimal separation were determined to be 16 bytes and the ECC only accommodates reconstruction of 8 bytes, an 8-byte pad field may be provided immediately after the primary sync byte 14. This modification requires the addition of a delay period in the normal read process between sync byte detection and the start of reading data. Another alternative is to provide the secondary VFO field 60 and to implement the corresponding error recovery procedure described below.

With the data block format of FIG. 4, it may be possible to begin error recovery while still in the target data block, avoiding extra disk revolutions required by other error recovery procedures. When possible, this implementation makes the format of FIG. 4 particularly desirable for high performance disk drives. The ability of a disk drive to execute immediate recovery of the secondary sync byte field 62 depends on the response time of the disk drive electronics. In addition, if the ECC algorithm is powerful enough to reconstruct more bytes than required for optimal sync byte field separation 64, the first data subfield 68 can be expanded to provide additional time for the read channel electronics to switch from a normal operating mode to an error recovery mode.

Figure 5A:
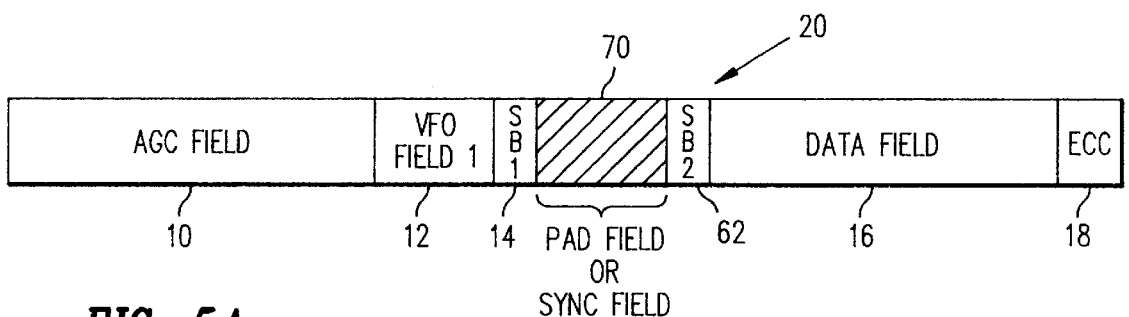
FIG. 5A depicts a data block format including a redundant sync byte field between the primary sync byte field and the data field according to a third embodiment of the present invention.
Figure 5B:
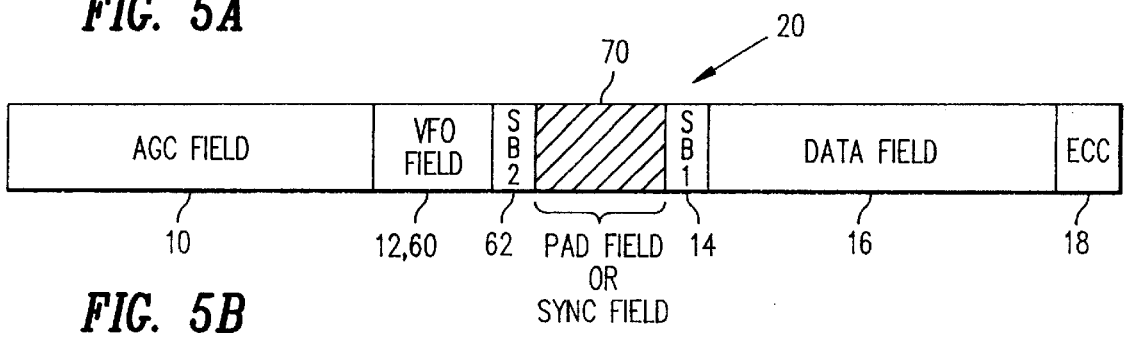
FIG. 5B depicts a data block format including a redundant sync byte field between the primary sync byte field and the AGC field, according to a fourth embodiment of the present invention.

Third and fourth data block formats are shown in FIGS. 5A and 5B. Each provides a secondary sync byte field 62 sufficiently isolated from the primary sync byte field 14, while leaving the AGC and data fields 10,16 intact. In the format of Fig. SA, the secondary sync byte 62 follows the primary sync byte 14. This arrangement, like the data block format of FIG. 4, is particularly suited to high performance disk drives if immediate recovery of the secondary sync byte field 62 is possible. To improve the possibility of immediate recovery, region 70 can be expanded to accommodate the response time of the data channel.

The format of FIG. 5B provides the secondary sync byte field 62 in a position prior to the primary sync byte field 14. The region 70 between the sync byte fields 14, 62 provides at least the number of bytes required for optimal predetermined separation. Optimal separation is determined as previously described. In addition, region 70 may optionally provide a sufficient number of bytes for a secondary VFO field.

In the arrangements of either FIG. 5A or 5B, the primary and secondary sync bytes are detectable using only a single VFO field 12,60 after the AGC field 10, as described in the corresponding error recovery procedure below. For disk drives in which data capacity is an issue, the length of region 70 is preferably no greater than the optimal isolation byte length.

The length of the data block shown in FIGS. 5A and 5B may be identical to that of the data block 20 of FIG. 1, resulting in a smaller data field 10,16. Alternatively, the data field length is held constant and the total block size is increased proportionally.

Disk Drive Electronics

Figure 6:
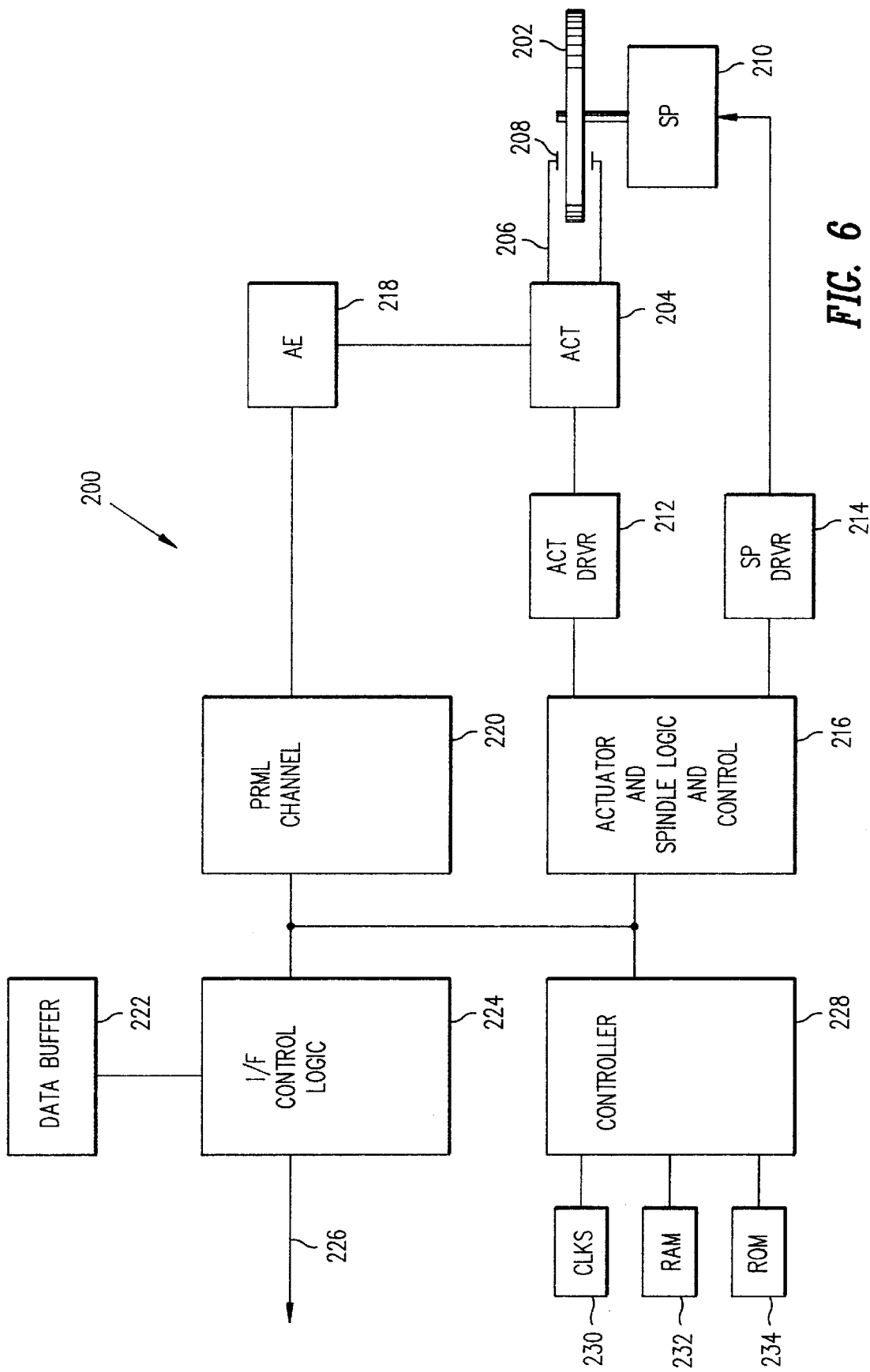
FIG. 6 is a block diagram depicting a disk drive suitable for practicing the present invention.

FIG. 6 is a block diagram representing the functional blocks of a disk drive suitable for practicing the present invention. It shall be understood that the disk drive shown is for illustration purposes only and that numerous disk drive designs may be adapted for the proposed sync byte detection scheme.

The disk drive system 200 of FIG. 6 stores information on the surfaces of one or more rotatably mounted storage disks 202 in the form of magnetic transitions or patterns formed on a plurality of annular data tracks. The disks are supported by a spindle motor 210, and rotation of the spindle motor is driven by spindle motor driver electronics 214. The magnetic transitions are sensed or "read" from disk 202 via one or more transducers 208 supported in close proximity to the disk surfaces. A transducer converts the patterns into an electrical signal for provision to a data channel 220, which is preferably of the partial response, maximum likelihood (PRML) type. It shall be understood, however, that other types of data channels can readily be adapted to the present invention. The transducer(s) are positioned over the disk via an actuator assembly 204 preferably comprising a rotary positioning voice coil motor (VCM) and a positionable block of one or more actuator arms supporting the transducer(s) on flexible suspension(s) 206. The VCM is driven by actuator driver circuit 212.

Control of the actuator and spindle motor driver circuits 212,214 is provided by an actuator and spindle control circuit 216 that may comprise, for example, an integrated chip including a Texas Instruments digital signal processor (TMS320) and any other necessary support logic.

Data provided to the disk drive for storage is typically first encoded and synchronized. Thus the read operation further requires decoding and synchronization of the sensed data signal. These functions of the data channel 220 will be described subsequently. Once processed, the data must be transmitted by the disk drive in a form recognizable to the device requesting the data retrieval. Interface control logic 224 is provided to manage this task by performing a plurality of functions. The functions include 1) managing the transfer of data from the channel to a data buffer 222, i.e., the well-known functions of a disk controller and data buffer manager; and 2) directing the transfer of data from the data buffer 222 to the host over a data bus 226 according to an expected data transfer protocol, i.e., the well-known functions of a data buffer and an interface. These combined functions are available to disk drives implementing the Small Computer Systems Interface (SCSI), for example, in the Western Digital WD61C96 integrated package. Alternatively, the disk controller, interface, and buffer manager are available in a variety of chip sets commercially available for SCSI interface protocols, as well as other interface protocols, e.g., serial storage architecture (SSA), fibre channel, peripheral component interconnect (PCI) and Personal Computer Memory Card International Association (PCMCIA).

Data buffer 222 generally provides a predetermined quantity of random access memory (RAM), the size being determined by performance requirements and cost limitations of the desired disk drive design.

Master control over the various functions of the disk drive is typically overseen today by a controller 228 embedded within the disk drive. The controller 228, preferably the commercially available AMD 80C186 by Advanced Micro Devices Corp., comprises a microprocessor and may also include support logic (e.g., counters, an interrupt controller, a direct memory access (DMA) controller, a serial interface controller, and other functions generally known to assist microprocessor control functions). The controller is normally associated with a predetermined amount of read-only-type memory (ROM) 234 for storing a control program, RAM 232, and a reference clock 230. The controller 228 directly oversees operation of the interface control logic 224, the data channel 220, and actuator and spindle control circuit 216.

Figure 7:
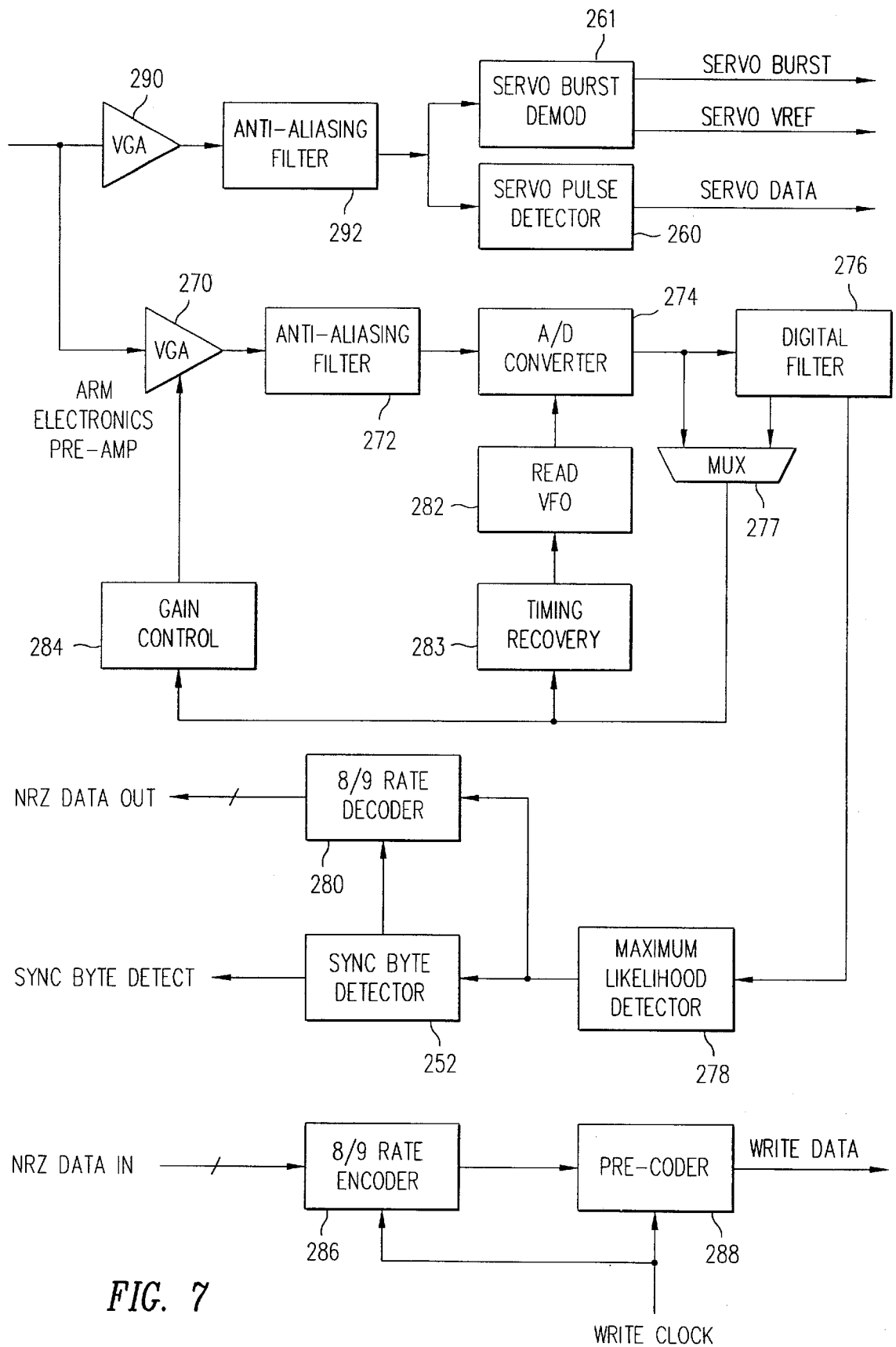
FIG. 7 is a block diagram of PRML data channel electronics suitable for practicing the present invention.

The data channel 220 is shown in detail in FIG. 7. It shall be understood, however, that the channel is shown for illustration purposes only and that numerous data channel architectures can be adapted for implementing the present invention. The write path begins with encoder 286, which receives data to be written and produces a modulation coded output having predefined run length constraints. Such constraints include, for example, the minimum and maximum number of consecutive zeros, and the maximum run length of zeros in the even and odd recorded sequences in the overall recorded sequences. Preferably, an 8,9 encoding scheme is used. The encoded output is received by precoder 288, combined with a write clock signal, and provided to precompensation logic in the arm electronics (not shown). The precompensation logic produces a modulated binary pulse signal which in turn is applied to a write circuit for generation of a modulated write current to be written to the disk.

Next, the read path of data channel 220 will be described. Prior to reaching the data channel, information from the disk is sensed and converted into an analog electrical read signal by the transducer, and then preamplified in the arm electronics (AE). In a first stage of the read path, the preamplified read signal is provided to a variable gain amplifier (VGA) 270 for amplification and normalization, and then through an anti-aliasing filter 272 to an analog-to-digital converter (ADC) 274 for conversion. The ADC 274 provides, for example, 64 possible 6-bit sampled values representative of voltage amplitudes. The sampled values from ADC 274 are next applied to a digital filter 276. Feedback from the input stage of the digital filter is provided through multiplexor (MUX) 277 to timing recovery logic 283 for use in tuning a variable frequency oscillator (VFO) 282 to the frequency and phase of the read signal. Output from the digital filter 276 is provided to gain control logic 284 through MUX 277 for tuning the VGA 270 to a predetermined normalized amplitude. These feedback circuits respectively comprise the VFO and AGC circuits previously referred to. Preferably, the VFO circuit is capable of performing "fast sync" operations. The output from the digital filter 276 is also applied to a Viterbi or maximum likelihood decoder 278 for producing meaningful digital data.

The digital data is fed to the sync byte detector 252 for detection of the unique sync byte patterns corresponding to a sync byte field of a data block. Sync byte detection circuitry is generally well-known in the art, and typically comprises a shift register for storing a segment of the incoming bitstream, a register for storing a known sync byte pattern, and compare logic for comparing the contents of the two registers. Detector 252 also preferably includes logic for implementing a two-out-of-three sync byte detecting scheme. Once a sync byte or group of sync bytes have been identified, the sync byte detector 252 stops looking for sync bytes, and begins forwarding 9-bit data bytes to decoder 280 (e.g., 8,9). Data transfer is preferably controlled by a combination of logic within the sync byte detector 252 and control code executed by the interface control logic 224. For example, reset counter initialized by the occurrence of a sync byte and clocked by the VFO reference clock or a system clock counts the number of data bits entering the shift register. On reset, the resulting data byte is latched out of the shift register to the decoder 280. Alternatively, the clock pulses controlling the shift register are counted in the control program. The sync byte detector logic or control program also counts the number of bytes transferred. This may be accomplished, for example, by a countdown counter loaded with a byte count and decremented once for every byte transferred. Alternatively, the byte count is maintained in the control code. Decoder 280 decodes the 9-bit bytes into 8-bit digital data bytes, thus completing the maximum likelihood (ML) detection process for data readback.

According to the preferred disk format, the information read from the disk 202 as it rotates will include positional information from the servo sectors 30 as well as information from the data sectors sandwiched therebetween. For this reason, the data signal is also provided from the PRML channel to servo detection logic that preferably includes servo burst demodulator 261 and servo pulse detector 260. The servo logic, which resides, for example, in a separate chip or is integrated into the actuator and spindle logic and control circuit 216 of FIG. 6, extracts the servo information from the digital stream for use in track seeking and track following operations.

The data channel is capable of operating in a write mode, a read mode, and a servo mode, each being invoked by control signals provided by the disk controller function of the interface control logic 224. When read mode is activated, the sync byte detector 252 is enabled for a predetermined window of time during which it looks for the primary sync byte pattern(s). If a sync byte is found during the detection window, the sync byte detector 252 stops searching and commences data transfer to the decoder circuit 280.

If a sync byte is not found during the timing window, the sync byte detector logic or control code generates a sync byte not found indication which invokes an error recovery routine or mode. Preferably, the error recovery routine first attempts to reread the sync byte(s) on a subsequent disk revolution. If this fails, a disk drive implementing the present invention invokes one of the error recovery procedures described below to detect the secondary sync bytes. At this point, it should be apparent that elements of the read path or the corresponding control code will be required to support additional functions exclusive to error recovery. For example, in at least one implementation, the AGC circuit is required to hold its current gain value for a predetermined time. This can be accomplished, for example, by disabling the data signal input to the VGA 270. Also in at least one implementation, the PRML circuit must be turned off while the transducer is passing over the defective primary sync byte, which may otherwise cause synchronization errors. The sync byte detector 252 requires delay logic or control code to delay the detection and transfer of data bytes after sync byte detection. It may also require delay logic or control code for extending or regenerating the sync byte detection window after VFO synchronization (e.g., when a primary VFO field 12 is used for synchronizing the VFO prior to reading the secondary sync byte 62); similar means for generating a first detection window over the primary VFO field and a second detection window over the second VFO field, or vice versa, while in the same data block; and/or logic or control code for substituting for the normal data field byte count with an error recovery data byte count representative of a shortened data field length. Some of these functions may already be supported in the disk drive electronics. For example, substitution of data field length is already present in disk drives accommodating split data fields. Other adaptations will be readily apparent to those having ordinary skill in the art.

Normal Read Mode Sequence

Figure 8:
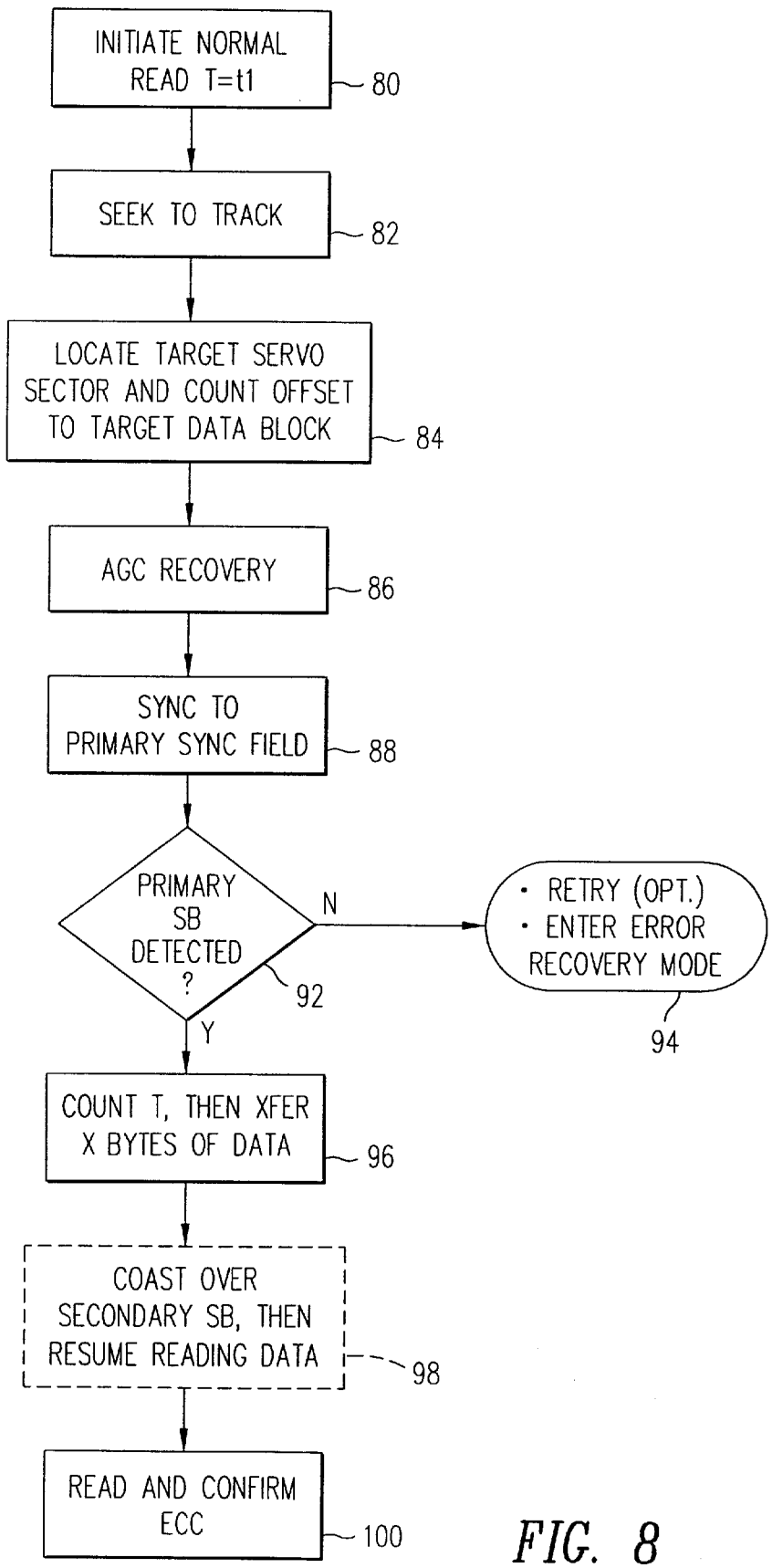
FIG. 8 is a flow diagram of a normal read process suitable for a disk drive practicing the present invention.

FIG. 8 is a flow diagram representing a normal read process that may be implemented in the disk drive electronics of a sector servo disk drive with the headerless data format of FIG. 1. While the read process shown is provided as an example for a better understanding of the invention, it shall be understood that other read processes may also be suitable for implementing the present invention and as such are considered equivalent to the method shown.

As is generally known, a data request is first received by the disk drive in the form of a logical target block address, and is converted into a physical target address, e.g., via a look-up table in memory. The physical block address contained therein preferably provides a corresponding cylinder, head, sector, and sector offset for locating the target block. The process for mapping a logical block address to a physical block address of this format is described in previously cited U.S. Pat. No. 5,438,559, and as such will not be described in further detail.

In response to the data request, a normal read operation is initiated (step 80) and a predetermined value t1 is assigned to variable T. The variable T represents the timing delay between detection of the primary sync byte field 14 of a target data block 20 and the occurrence of the first readable data byte beneath the active transducer. The value of T determines initiation of data transfer from the sync byte detector 252 to decoder 280. The primary sync byte field 12 preferably immediately precedes the data field to avoid wasting disk real estate, and the corresponding value of t1 is zero. This value remains the same in the normal read process when implementing the data block format of FIG. 3 or FIG. 5B according to the teaching of the present invention. However, as should be apparent to one of ordinary skill in the art, the value of T must be changed to a nonzero value when implementing the data formats of FIGS. 4 or 5A.

In a next step 82, the actuator and spindle controller 216 causes a seek to the cylinder specified in the physical block address. At the same time, the head specified in the physical address is activated over the track containing the target data block 20. Methods for seeking to a track are well-known in the art, and the particular seeking method employed is not pertinent to an understanding of the present invention.

After a successful seek, the target data block 20 is located in a next step 84 by reading the grey code 46 or SID of each servo sector 42 passing beneath the read head 202, and on detection of the servo sector specified by the physical address, waiting for a period of time specified by the sector offset portion of the physical address. When the offset time has elapsed, read head 202 will be positioned over a first portion of the AGC field 10. At this point, the AGC circuit in the AE 218 commences gain normalization as indicated by the AGC recovery step 86. If a secondary sync byte field 62 is present in the AGC field 10 as in the data block format of FIG. 3, it should not interfere with gain adjustment.

After gain normalization, the transducer will be generally positioned over the sync or VFO field 12 to begin the VFO synchronization step 88. If the AGC and VFO fields 10,12 are written with the same, continuous VFO pattern, synchronization may commence while the head is still positioned over the AGC field. However, for the data block format of FIG. 3, care must be taken to position the transducer past the secondary sync byte field 62 before starting VFO synchronization, as the sync byte pattern may cause errors in the VFO circuit.

After synchronization, the error recovery method proceeds to a primary sync byte detection step 92. In this step 92, the sync byte detector 252 searches for at least two out of three primary sync byte patterns for the duration of the sync byte detection timing window previously described. If a sync byte 14 is detected, the timing and control circuit waits the predetermined delay period T, and then initializes and directs the transfer of a predetermined number X of data bytes from the sync byte detector 252 to the decoder 280, as shown in step 96. For disk drives using the data block format of FIG. 4, a next step 98 is preferably inserted into the normal read process to momentarily disable the PRML detection circuit as the transducer "coasts" over the secondary sync byte field 62. Alternatively, the secondary sync byte patterns are transferred with the user data and ignored further down the read path (provided that reading the secondary sync bytes does not cause errors to occur in any of the data path elements). At completion of data transfer, the ECC bytes are read to verify data validity (step 100) according to methods presently practiced in the art.

The error recovery procedures according to the present invention shall be described next with reference to FIGS. 9 and 10. These procedures are invoked at control branch 94 of FIG. 8 when a failure to read the primary sync byte field 12 has occurred. Additional attempts to read the primary sync byte may be made first, as indicated in FIG. 8. Upon failure of the additional attempts, the disk drive controller enters into error recovery mode and initiates one of the following secondary sync byte detection processes.

Secondary Sync Byte Detection Error Recovery Procedures

Figure 9:
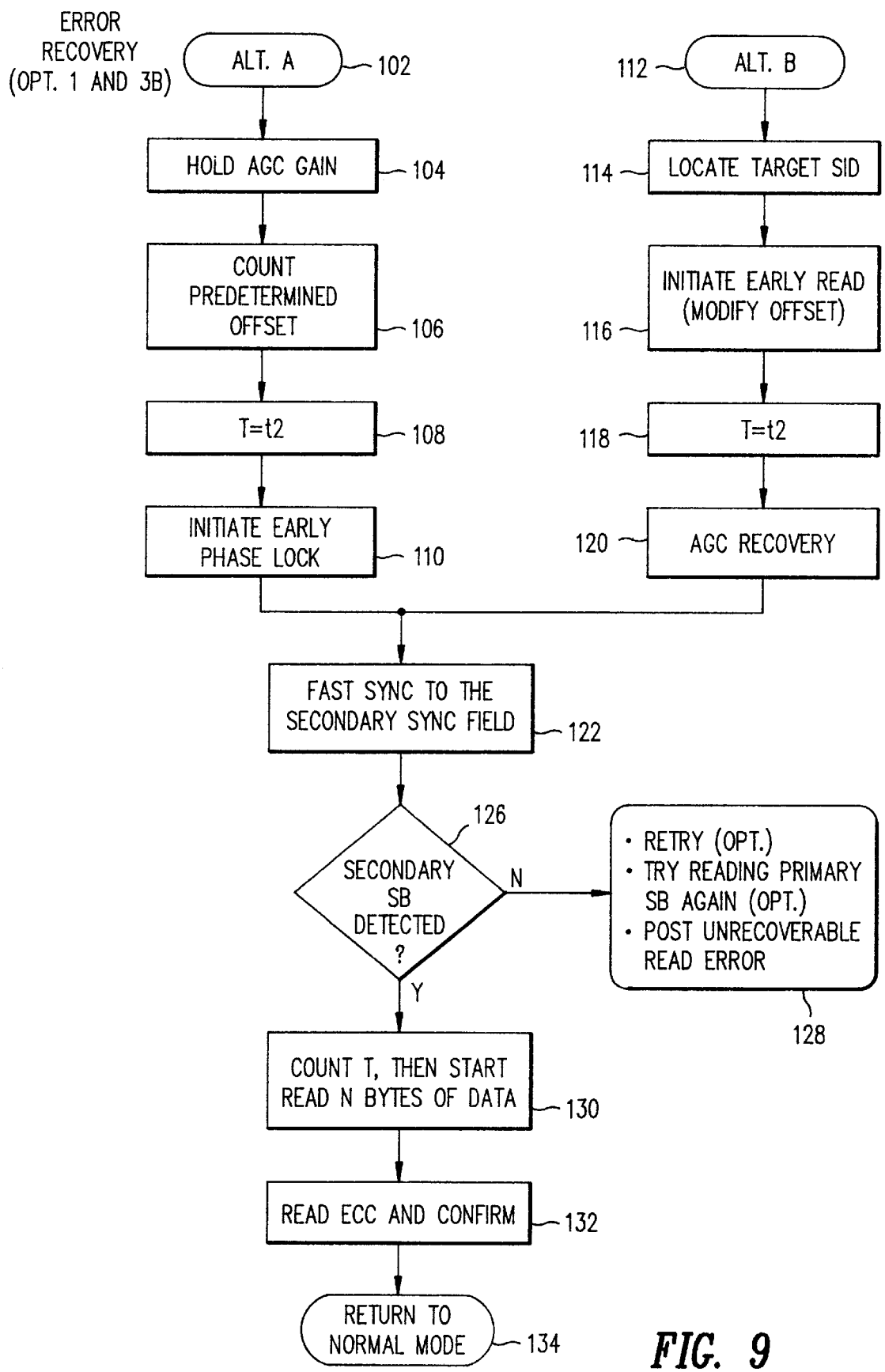
FIG. 9 is a flow diagram of the preferred methods for performing a read operation in error recovery mode in a disk drive having the data block format of FIG. 3 or FIG. 5B.

FIG. 9 is a flow diagram representing the preferred error recovery process for the data formats shown in FIGS. 3 and 5B. The error recovery process of FIG. 9 is initialized upon a determination that the primary sync byte 14 is unreadable. Since the secondary sync byte field 62 of both formats precedes the primary sync byte field 14, at least one additional revolution must be made to position the transducer 102 for secondary sync byte detection.

Two alternative flow paths for the process of FIG. 9 are shown. In the first (alternative A) 102, the AGC gain is set and held prior to reaching the target SID (step 104). For example, since the gain has already been set in the target data block 20 when primary sync byte 14 detection fails, this gain can be held during the subsequent revolution for a predetermined period of time until the transducer is positioned over the target block's AGC field. The predetermined time can be approximated, for example, by calculating the duration of 1 revolution of the disk minus the time required for the AGC, primary synchronization, and primary sync byte fields 10,12,14 to pass the active read head. Gain is alternatively preset in the AGC field of any data block preceding the target block, and is then held until the target block is reached.

The secondary sync byte 62 in the data block formats of FIGS. 3 and 5B is displaced from the start of data, requiring delay T to be set to a new, nonzero value. Although assignment of T is shown to occur in step 108, it will be understood that T may be assigned at any convenient time prior to or including the secondary sync byte detection step 126.

When the target block is reached, VFO synchronization (step 110) is performed in the AGC field 10 prior to reaching the secondary sync bytes. To aid completion, a fast sync operation is desirable. Alternative A is applicable to all data blocks 20 having the format of FIG. 3 or FIG. 5A, but is particularly useful for recovery of data blocks which are immediately preceded by servo sectors having an amplitude different from that of the data block 20.

The alternative flow path (alternative B) 112, in contrast, is only applicable to data blocks 20 having the data block format of FIG. 3 or 5B which are not preceded by servo sectors, e.g., data blocks 20 preceded by other data blocks 20 or portions thereof. Under this scheme, an early read is initiated 116 after detection of the target SID 114, rather than holding the AGC gain, thereby starting the AGC recovery step 120 in a field prior to the target data block 20. An early read is performed, for example, by reducing the servo sector offset of the target address by an amount sufficient to allow AGC recovery and VFO locking before the secondary sync byte 62 is reached. AGC recovery 120 prior to the target block is possible because other data blocks 20 of the preferred embodiment will be of the same amplitude as the target block. Note that delay T must be set to a new value (step 118) as in alternative A 102. It will be understood, however, that T may be assigned its new value at any convenient time prior to and including the secondary sync byte detection step 126.

Alternatives A 102 and B 112 are otherwise the same from the VFO synchronization step 122 forward. Upon obtaining VFO lock, the secondary sync bytes are detected in a step 126 coinciding with an adjusted sync byte detection window (discussed previously). A fast synchronization operation is preferred. If at least two out of three of the secondary sync bytes are detected, then X bytes of data are transferred to the data buffer 222 after waiting for the adjusted delay period T (step 130). Upon completion of data transfer, the ECC bytes are read and confirmed 132 according to presently known methods. Control is then returned to a normal operating mode.

If the secondary sync bytes 62 are not detected in step 126, an attempt can be made to reread the primary sync bytes 14 while still within the target data block 20. If the reread attempt fails, or alternatively, if a reread is not attempted at this point, the secondary sync byte detection procedure is repeated until successful or until a desired number of iterations have been made. If detection continues to fail, the channel 220 may attempt to detect the primary sync bytes 14 again as described with reference to FIG. 8. If all attempts fail, however, an unrecoverable read error is posted and the data block 20 is flagged as defective according to known defect mapping methods.

Figure 10:
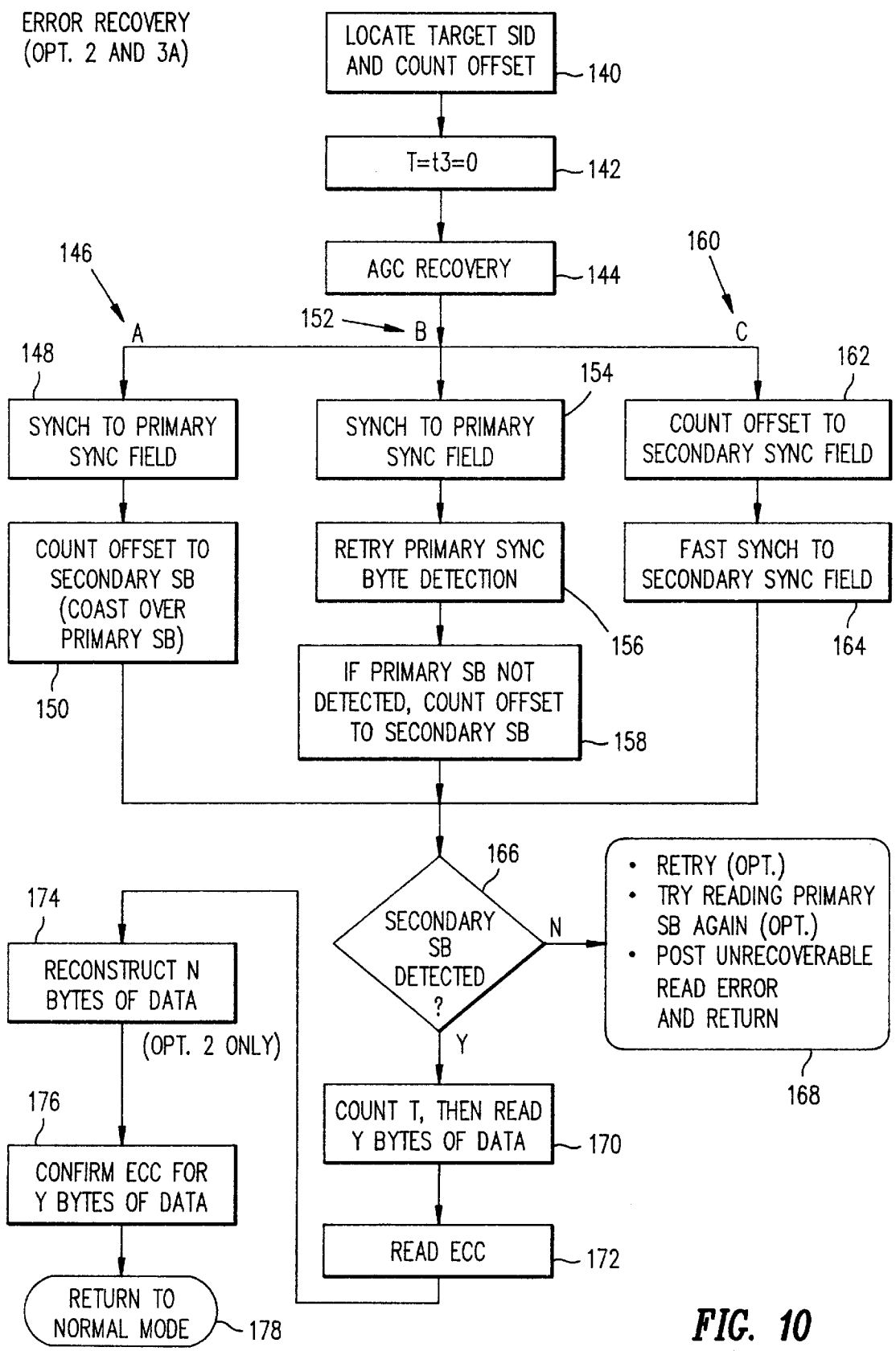
FIG. 10 is a flow diagram of the preferred methods for performing a read operation in error recovery mode in a disk drive having the data block format of FIG. 4 or FIG. 5A.

FIG. 10 is a flow diagram representing the preferred error recovery process for the data formats shown in FIGS. 4 and 5A. Like the error recovery process of FIG. 9, the method of FIG. 10 is initialized upon a determination that the primary sync byte field 14 is unreadable. Since the secondary sync byte field 62 in either data block format succeeds the primary sync byte field 14, error recovery can be initiated while still within the target data block as previously discussed—provided that the disk drive electronics have sufficient time to change modes. If error recovery cannot be invoked while still in the data block, at least one additional revolution is required to position the head over the data block for secondary sync byte detection.

In a first step 140, the physical block address is used to locate the target SID and position the transducer 208 over the AGC field of the target data block 20 for AGC recovery step 144. The secondary sync byte 62 of the data block is preferably directly adjacent to data field 16 or subfield 69 so that delay T is set to zero. Again, it shall be understood that although T is assigned a value in step 142 of FIG. 10, this value may alternatively be assigned at any convenient time prior to and including the secondary sync byte detection step 166.

Three alternative flow paths are shown following AGC recovery step 144 in FIG. 10. In first and second alternatives, A 146 and B 152, the VFO is preferably synchronized to the primary VFO field 12 (steps 148 and 154). Accordingly, these paths are appropriate when at least one revolution occurs prior to invocation of the error recovery procedure. Implementation of either path A 146 or path B 152 eliminates the need for a secondary VFO field 60. However, both paths may be modified to sync to a secondary VFO field 60 (if provided) or to the first data field 68 of the FIG. 4 format, rather than to the primary VFO field 12. Alternative B differs from A in step 156 by executing another attempt to read the primary sync bytes 14 after VFO locking step 154. If this reread fails, an attempt is immediately executed to read the secondary sync byte field 62. Alternatives A, B, and C each require the sync byte detection window to remain on for a longer period of time in error recovery mode than is required for primary sync byte detection so that the sync byte detector 252 remains enabled when the transducer passes over the secondary sync byte field 62.

Alternative C primarily differs from alternatives A and B by executing an immediate attempt to read the secondary sync byte field 62 after failing to read the primary field 14. If VFO locking is required between the primary and secondary sync byte fields 14,62, a fast sync operation is preferably performed on the secondary VFO field 60. Alternative C 160 is particularly appropriate, for example, when the disk drive electronics are able to switch from normal mode to error recovery mode in the time available between the primary and secondary sync bytes 14, 62.

Alternatives A 146, B 152 and C 160 are the same from the secondary sync byte detection step 166 forward. If at least two out of three of the secondary sync bytes are detected, then data transfer commences after the lapse of delay period T (preferably zero) and Y bytes of data are then transferred to the data buffer 222. (Step 170). For the data format of FIG. 4, Y represents the number of data bytes in the second data subfield 69, and for the format of FIG. 5A, Y<=X.

Upon completion of data transfer, the ECC bytes are read and confirmed (step 176) according to presently known methods. For the data block format of FIG. 4, an additional step 172 is provided wherein the ECC information is used to reconstruct the N lost bytes of the first data subfield 68, again according to a presently known ECC algorithm. Upon completion of ECC verification step 176, control is returned to a normal operating mode via branch 178.

If the secondary sync bytes 62 are not detected in step 166, the error procedure is preferably repeated one or more times. If detection still fails, the channel 220 may attempt to detect the primary sync bytes 14 again as described with reference to FIG. 8. If all attempts fail, however, an unrecoverable read error is posted and the data block 20 is flagged as defective.

A number of data block formats and secondary sync byte detection methods have been described encompassing the present invention. Nevertheless, it will be understood that various modifications may become apparent to those having ordinary skill in the art of data retrieval without departing from the spirit and the scope of the present invention. Accordingly, it is to be understood that the invention is not to be limited by the specific illustrated embodiments, but only by the scope of the appended claims.

What is claimed is:

1. A sync byte detection system for use in a disk drive, comprising:

a rotatable disk comprising at least one track for storing data in blocks of a predefined format, the data block format comprising a primary sync byte field including a primary sync byte pattern, a redundant sync byte field including a redundant sync byte pattern, and a data field, the primary and redundant sync byte fields being separated by an isolating region comprising at least one byte, and the primary and redundant sync byte fields are each configured to store data indicating the beginning of the data field;

a transducer;

means for selectably positioning the transducer in close proximity to the disk;

a data channel coupled to the transducer and including a sync byte detection circuit for detecting a sync byte pattern in an electrical signal received from the transducer; and mode selecting means for conditioning the sync byte detection circuit to detect the primary sync byte pattern to synchronize to said data field in a first mode of operation and the redundant sync byte pattern to synchronize to said data field in a second mode of operation, wherein the primary sync byte pattern and the redundant sync byte pattern are detected prior to a reading of said data field.

2. The sync byte detection system of claim 1, further comprising at least one VFO field for producing an electrical signal of predetermined frequency.

3. The sync byte detection system of claim 2, wherein the VFO field precedes the primary sync byte field with respect to the transducer when positioned over the rotating disk.

4. The sync byte detection system of claim 2, wherein the VFO field precedes the redundant sync byte field with respect to the transducer when positioned over the rotating disk.

5. The sync byte detection system of claim 2, wherein the isolating region of the data block includes the VFO field.

6. The sync byte detection system of claim 1, wherein the data block further comprises:
   a preamble preceding said primary sync byte field, said preamble including an amplitude adjustment field and a primary phase/frequency synchronization field; and
   a gain adjustment field for producing an electrical signal of a first amplitude, wherein the redundant sync byte field resides within said gain adjustment field.

7. The sync byte detection system of claim 6, further comprising a gain control circuit coupled between the transducer and the sync byte detection circuit for receiving the electrical signal of a first amplitude and for amplifying the signal to a second, predetermined amplitude.

8. The sync byte detection system of claim 6, wherein the gain adjustment field of the data block includes the redundant sync byte field.

9. The sync byte detection system of claim 6, wherein the isolating region of the data block includes a portion of the gain adjustment field.

10. The sync byte detection system of claim 1, wherein the primary sync byte field comprises a plurality of sync byte patterns.

11. The sync byte detection system of claim 10, wherein the primary sync byte field comprises three sync byte patterns, and wherein a sync byte is found when the detection circuit detects at least two of the three patterns.

12. The sync byte detection system of claim 1, wherein the redundant sync byte field comprises a plurality of sync byte patterns.

13. The sync byte detection system of claim 12, wherein the redundant sync byte field comprises three sync byte patterns, and wherein a sync byte is found when the detection circuit detects at least two of the three patterns.

14. The sync byte detection system of claim 1, wherein the data block is headerless.

15. The sync byte detection system of claim 1, wherein said redundant sync byte field enables reading of data corresponding to said primary sync byte field when an error occurs in reading said primary sync byte field.

16. A magnetic disk drive, comprising:
   a spindle motor assembly;
   a storage disk, rotatably mounted to the spindle motor assembly for storing data in blocks having a predefined format, the data block format comprising a primary sync byte field having a primary sync byte pattern, a redundant sync byte field having a redundant sync byte pattern, and a data field, and wherein the primary and redundant sync byte fields are separated by an isolating region comprising at least one byte, and the primary and redundant sync byte fields are each configured to store data indicating the beginning of the data field;
   an actuator assembly;
   a transducer supported on the actuator assembly in close proximity to the disk for reading the data blocks and producing an electrical signal therefrom;
   means for operably controlling the spindle motor assembly and the actuator assembly;
   a data channel coupled to the transducer for processing the electrical signal, including a sync byte detection circuit for detecting a sync byte pattern in the electrical signal;
   mode selecting means for selectively conditioning the sync byte detection circuit to detect the primary sync byte pattern to synchronize to said data field in a first mode of operation and the redundant sync byte pattern to synchronize to said data field in a second mode of operation, wherein the primary sync byte pattern and the redundant sync byte pattern are detected prior to a reading of said data field;
   means for operably controlling the data channel; and
   means for providing the processed data signal to a host device.

17. The magnetic disk drive of claim 16, further comprising at least one VFO field for producing an electrical signal of predetermined frequency.

18. The magnetic disk drive of claim 17, wherein the VFO field precedes the primary sync byte field with respect to the transducer when positioned over the rotating disk.

19. The magnetic disk drive of claim 17, wherein the VFO field precedes the redundant sync byte field.

20. The magnetic disk drive of claim 17, wherein the isolating region of the data block includes the VFO field.

21. The magnetic disk drive of claim 16, wherein the data block further comprises:
   a preamble preceding said primary sync byte field, said preamble including an amplitude adjustment field and a primary phase/frequency synchronization field; and
   a gain adjustment field for producing an electrical signal of a first amplitude, wherein the redundant sync byte field resides within said gain adjustment field.

22. The magnetic disk drive of claim 21, further comprising a gain control circuit coupled between the transducer and the sync byte detection circuit for receiving the electrical signal of a first amplitude and for amplifying the signal to a second, predetermined amplitude.

23. The magnetic disk drive of claim 21, wherein the gain adjustment field of the data block includes the redundant sync byte field.

24. The magnetic disk drive of claim 21, wherein the isolating region of the data block includes a portion of the gain adjustment field.

25. The magnetic disk drive of claim 16, wherein the primary sync byte field comprises a plurality of sync byte patterns.

26. The magnetic disk drive of claim 25, wherein the primary sync byte field comprises three sync byte patterns, and wherein a sync byte is found when the detection circuit detects at least two of the three patterns.

27. The magnetic disk drive of claim 16, wherein the redundant sync byte field comprises a plurality of sync byte patterns.

28. The magnetic disk drive of claim 27, wherein the redundant sync byte field comprises three sync byte patterns, and wherein a sync byte is found when the detection circuit detects at least two of the three patterns.

29. The magnetic disk drive of claim 16, wherein said redundant sync byte field enables reading of data corresponding to said primary sync byte field when an error occurs in reading said primary sync byte field.

* * * * *